United States Patent
Xia et al.

(10) Patent No.: US 9,119,197 B2
(45) Date of Patent: Aug. 25, 2015

(54) SYSTEM AND METHOD FOR DELAY SCHEDULING

(71) Applicant: FutureWei Technologies, Inc., Plano, TX (US)

(72) Inventors: Jinhuan Xia, Shenzhen (CN); Brian Classon, Palatine, IL (US); Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 85 days.

(21) Appl. No.: 13/899,251

(22) Filed: May 21, 2013

(65) Prior Publication Data

US 2013/0315159 A1 Nov. 28, 2013

Related U.S. Application Data

(60) Provisional application No. 61/650,339, filed on May 22, 2012.

(51) Int. Cl.
*H04W 72/04* (2009.01)
*H04W 84/12* (2009.01)
*H04W 72/12* (2009.01)

(52) U.S. Cl.
CPC ............ *H04W 72/042* (2013.01); *H04W 72/12* (2013.01)

(58) Field of Classification Search
USPC ................................. 370/329, 337, 347, 465
See application file for complete search history.

(56) References Cited

U.S. PATENT DOCUMENTS

| | | | |
|---|---|---|---|
| 2006/0120408 A1 | 6/2006 | Willenegger | |
| 2012/0051283 A1* | 3/2012 | Takahashi et al. | 370/315 |
| 2013/0039254 A1* | 2/2013 | Kim et al. | 370/312 |
| 2013/0176952 A1* | 7/2013 | Shin et al. | 370/329 |
| 2013/0242882 A1* | 9/2013 | Blankenship et al. | 370/329 |
| 2013/0286928 A1* | 10/2013 | Xu et al. | 370/315 |
| 2013/0308572 A1* | 11/2013 | Sayana et al. | 370/329 |
| 2014/0219202 A1* | 8/2014 | Kim et al. | 370/329 |
| 2014/0233518 A1* | 8/2014 | Lee et al. | 370/329 |
| 2014/0269594 A1* | 9/2014 | Jang et al. | 370/329 |
| 2014/0301336 A1* | 10/2014 | Kim et al. | 370/329 |

(Continued)

FOREIGN PATENT DOCUMENTS

| | | |
|---|---|---|
| CN | 101594205 A | 12/2009 |
| WO | 2009104085 A2 | 8/2009 |

(Continued)

OTHER PUBLICATIONS

PCT International Search Report and Written Opinion for PCT/CN2013/076073, Applicant: Huawei Technologies Co., LTD., dated Aug. 29, 2013, 10 pages.

(Continued)

*Primary Examiner* — Andrew Lee
(74) *Attorney, Agent, or Firm* — Slater & Matsil, L.L.P.

(57) ABSTRACT

In one embodiment, a method for delay scheduling includes determining whether a communications controller has information for a machine type communication (MTC) device and determining a first subframe to transmit a downlink control information (DCI) message on when the communications controller has information for the MTC device. The method also includes transmitting, by the communications controller to the MTC device, the first subframe including the DCI message and the information in accordance with the first subframe.

24 Claims, 4 Drawing Sheets

(56) References Cited

U.S. PATENT DOCUMENTS

2014/0321406 A1* 10/2014 Marinier et al. ............ 370/329
2015/0016419 A1* 1/2015 Kim et al. .................. 370/331
2015/0031369 A1* 1/2015 Gunnarsson et al. ........ 455/438

FOREIGN PATENT DOCUMENTS

| WO | 2010045428 A1 | 4/2010 |
| WO | 2010051209 A1 | 5/2010 |
| WO | 2013175181 A1 | 11/2013 |

OTHER PUBLICATIONS

Extended European Search Report, Application No. 13794470.8, mailed Mar. 30, 2015, 7 pages.

* cited by examiner

SYSTEM AND METHOD FOR DELAY SCHEDULING

This application claims the benefit of U.S. Provisional Application Ser. No. 61/650,339 filed on May 22, 2012, and entitled "System and Method for Delay Scheduling," which application is hereby incorporated herein by reference.

TECHNICAL FIELD

The present invention relates to a system and method for wireless communications, and, in particular, to a system and method for delay scheduling.

BACKGROUND

In the Third Generation Partnership Project (3GPP) Long Term Evolution (LTE) Release-10 technical standards, transmissions from a communications controller to user equipments (UEs) include both data channels and control channels. LTE is a standard for wireless communication of high speed data for mobile phones and data terminals. Compared to Global System for Mobile Communications (GSM) Enhanced Data Rates for GSM Evolution (EDGE) and Universal Mobile Telecommunications System (UMTS) High Speed Packet Access (HSPA) network technologies, LTE increases the capacity and speed of a network by using a different radio interface along with core network improvements.

In LTE Release-10, the carrier bandwidth is one of six possible values (1.4 MHz, 3 MHz, 5 MHz, 10 MHz, 15 MHz, and 20 MHz). The frequency dimension contains subcarriers that may be 15 kHz apart. The time dimension of the system uses symbols, slots, subframes, and frames. In an example, the slots are 0.5 ms in duration. The subframes may contain two slots and be 1 ms in duration, while the frames may contain ten subframes and be 10 ms in duration. There are seven symbols in a slot when a normal cyclic prefix (CP) is used. When an extended CP is used, there are six symbols per slot. The subframes are numbered from 0 to 9.

SUMMARY

An embodiment method for delay scheduling includes determining a first subframe on which to transmit a first downlink control information (DCI) message and determining a second subframe on which to transmit a first information, where the first DCI message indicates scheduling of the first information. The method also includes determining a delay between the first subframe and the second subframe according to a capability of a user equipment and transmitting, by a communications controller to the user equipment, second subframe in accordance with the delay.

Another embodiment method for delay scheduling includes receiving, by a user equipment from a communications controller, symbols of a first subframe including a downlink control information (DCI) message and receiving, by the user equipment from the communications controller, symbols of a second subframe including information in accordance with a delay and a capability of the user equipment, where the DCI message indicates scheduling of the information. The method also includes obtaining the delay.

An embodiment communications controller includes a processor and a computer readable storage medium storing programming for execution by the processor. The programming includes instructions to determine a first subframe on which to transmit a downlink control information (DCI) message and determine a second subframe on which to transmit an information, where the DCI message indicates scheduling of the information. The programming also includes instructions to determine a delay between the first subframe and the second subframe according to a capability of a user equipment and transmit, to the user equipment, second subframe in accordance with the delay.

An embodiment user equipment includes a processor and a computer readable storage medium storing programming for execution by the processor. The programming includes instructions to receive, from a communications controller, symbols of a first subframe including a downlink control information (DCI) message and receive, from the communications controller, symbols of a second subframe including information in accordance with a delay and a capability of the user equipment, where the DCI message indicates scheduling of the information. The programming also includes instructions to obtain the delay.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
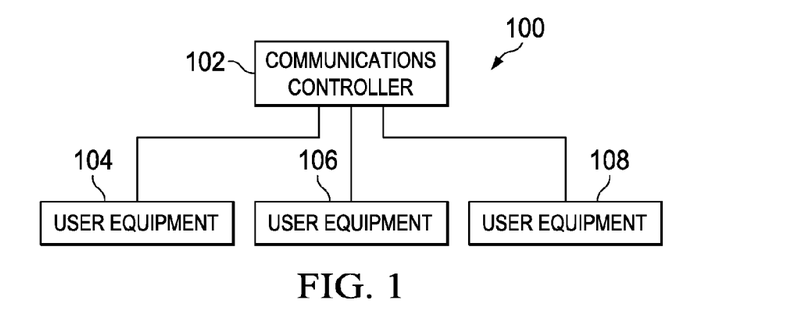
FIG. 1 illustrates an embodiment system for delay scheduling.

FIG. 1 illustrates system 100 for delay scheduling. System 100 includes communications controller 102, which may be referred to as an enhanced node B (eNB) or a base station. Coupled to communications controller 102 are user equipment (UE) 104, UE 106, and UE 108. In an example, UEs 104, 106, and 108 are mobile devices. Three UEs are pictured, but more or fewer UEs may be coupled to a single communications controller. One or more of UEs 104, 106, and 108 can be machine type communications (MTC) devices. The MTC device may be a wireless sensor, where the sensor takes some measurements. The sensor then conveys the information about the measurements using a wireless protocol. For instance, smart metering can be implemented using MTC technology. Other UEs are non-MTC devices, for example cell phones or other traditional devices.

MTC devices have a subset of features of non-MTC devices. For example, MTC devices may support a reduced bandwidth. In an example, a non-MTC device supports a bandwidth of up to 20 MHz, while an MTC device may support a bandwidth of 5 MHz or less. MTC devices are generally less expensive than non-MTC devices. One example of a less expensive MTC device may have a restricted payload size. Also, in another example, MTC devices may use only one receive antenna. In some applications, MTC devices are used in remote areas, such as basements, and need an additional 20 dB in link budget to have an equivalent coverage to that of non-MTC devices.

A system containing both MTC devices and non-MTC devices, such as system 100, provides compatibility to both MTC devices and non-MTC devices. For example, a physical downlink control channel (PDCCH) intended for non-MTC devices may be transmitted at the 20 MHz bandwidth. A physical control format indicator channel (PCFICH), which may also indicate the width of a control region, may be transmitted across the 20 MHz bandwidth. The width can be represented by a number of OFDM symbols. An MTC device operating at a lower bandwidth receives portions of the PDCCH and PCFICH, but not the entire PDCCH and PCFICH. When an MTC device cannot receive the entire PCFICH, it may not know the duration of the control region.

In LTE or enhanced LTE systems, resource scheduling is implemented in a transmission time interval (TTI). For example, the TTI may be transmitted with a 1 ms time interval. UE 104 initially receives the downlink control information (DCI) message in a physical downlink control channel (PDCCH). The DCI message may indicate the scheduling information for downlink data in a physical downlink shared channel (PDSCH) in the current subframe. For example, the DCI message includes resource allocation (RA), the modulation and coding scheme (MCS), and additional information. Also, the DCI message may indicate scheduling information for uplink data in the physical uplink shared channel (PUSCH) in a future subframe. In one example, the PDCCH spans the entire carrier bandwidth in the frequency domain, and occupies between one and four orthogonal frequency division multiplexing (OFDM) symbols in the time domain. When the carrier bandwidth is 3 MHz, 5 MHz, 10 MHz, 15 MHz, or 20 MHz, up to three OFDM symbols are used for the PDCCH. On the other hand, when a 1.4 MHz carrier bandwidth is used, the PDCCH is transmitted using between two and four OFDM symbols. A master information block (MIB) is transmitted on the center six resource block (RB) pairs. Then, subsequent access by UE 104 uses configuration information, such as the bandwidth, from the MIB. UE 104 may be scheduled to receive or transmit data on one or more physical resource block (PRB) pairs. In an example, the PRB pair occupies several OFDM symbols in the time domain and from twelve subcarriers to the entire bandwidth in the frequency domain. In one example, the number of symbols in a PRB pair is equal to the number of symbols in the data region. In an MTC device, a subset of the entire downlink PRB space may be examined in each subframe.

Figure 2:
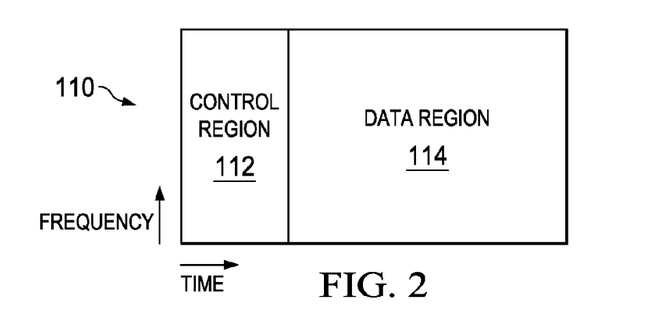
FIG. 2 illustrates a downlink subframe.

Symbols corresponding to a downlink subframe may be transmitted from communications controller 102 to UE 104. FIG. 2 illustrates downlink frame 110, which contains control region 112 and data region 114. The x axis illustrates the time domain, and the y axis illustrates the frequency domain. Control region 112 may contain a PDCCH, a physical control format indicator channel (PCFICH), a physical hybrid automatic request (HARD) indicator channel (PHICH), and other signals, such as common reference symbols. In general, control region 112 may contain zero, one, or more than one PDCCH. Control region 112 spans the entire bandwidth. Data region 114 may contain a PDSCH and other channels and signals. In general, data region 114 may contain zero, one, or more than one PDSCH.

An LTE system may use frequency division duplexing (FDD) or time division duplexing (TDD). TDD is an application of time-division multiplexing to separate uplink and downlink signals in time, possibly with a guard period situated in the time domain between the uplink and downlink signaling. In FDD, the uplink and downlink signals are at different carrier frequencies.

Figure 3:
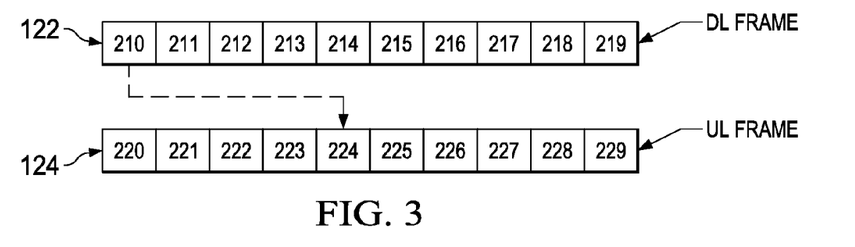
FIG. 3 illustrates subframe numbering for frequency division duplexing.

FIG. 3 illustrates downlink (DL) frame 122 and uplink (UL) frame 124 in an FDD system. Downlink frame 122 includes subframes 210-219, while uplink frame 124 contains subframes 220-229. The carrier frequency for downlink frame 122 is different from the carrier frequency for uplink frame 124. In an example, subframe 210 contains the PDCCH with scheduling information for the PDSCH in subframe 210. The PDCCH in subframe 210 also contains scheduling information for the physical uplink shared channel (PUSCH) in subframe 224. In FDD, the onset of subframe 21$x$ and subframe 22$x$ happen at the same time, where x is an integer between 0 and 9.

Figure 4:
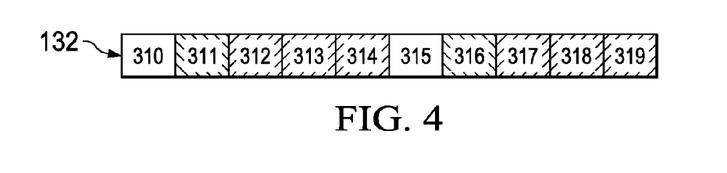
FIG. 4 illustrates subframe numbering for time division duplexing.

FIG. 4 illustrates frame 132 for use in a TDD system. In frame 132, subframes 310 and 315 are downlink subframes, while subframes 311 and 316 are special subframes. Special subframe contains a downlink pilot time slot (DwPTS), a guard period (GP), and an uplink pilot time slot (UpPTS). Subframes 312, 313, 314, 317, 318, and 319 are uplink subframes.

Delay scheduling may be used by the communication controller to receive or transmit information in later subframes. Delay scheduling facilitates the coexistence of MTC devices in a network that also supports non-MTC devices. In delay scheduling, delay values may be fixed or semi-statically changed. In one example, different delay values are used for different device types. For example, one delay value is used for MTC devices, while another delay value is used for non-MTC devices. For backwards compatibility, the delay value for certain non-MTC devices may be implicitly 0. In another example, one MTC device has a first delay value while another MTC device has a second delay value. With different delay values, separate common messages are sent to the MTC devices and the non-MTC devices. When delay scheduling is used, the HARQ timing may be adjusted, and resources for a HARQ response are reserved. When half duplex FDD (HD-FDD) is used, fixed or semi-statically configurable uplink and downlink configurations may be defined as in TDD. Alternatively, an uplink or downlink transmission may be dropped depending on its priority when a conflict appears. Delay scheduling may enable MTC devices to operate with an additional 20 dB of margin. Also, delay scheduling may allow MTC devices with small bandwidths to switch frequency subcarriers to receive data with the benefit of frequency selective scheduling.

If a UE, such as an MTC device, can obtain scheduling information before buffering of downlink transmissions, the UE may buffer only the scheduled physical resources, not the entire bandwidth of data. The size of buffer may be reduced, reducing the cost of the MTC device. Also system performance may be improved by frequency selective scheduling.

Another control channel in LTE is the enhanced PDCCH (ePDCCH). Like the PDCCH, the ePDCCH carries both uplink grants and downlink assignments. However, unlike the PDCCH, the ePDCCH uses a UE specific demodulation reference signal (DMRS).

Figure 5:
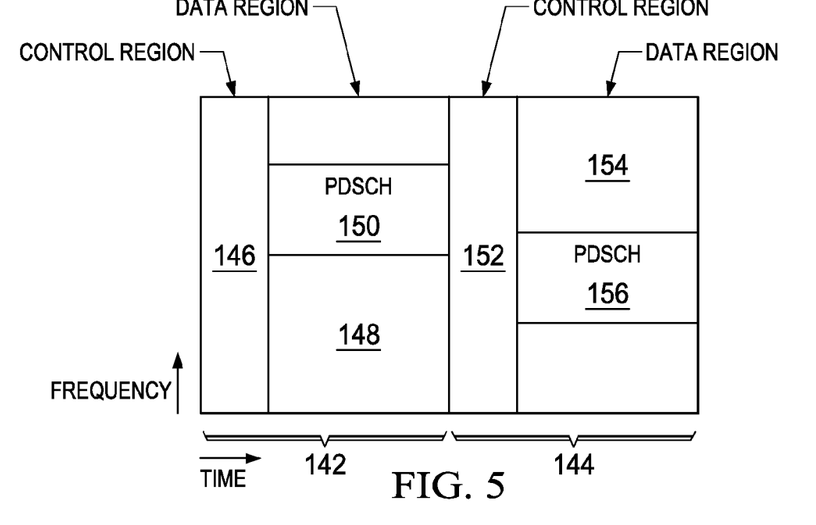
FIG. 5 illustrates two consecutive subframes.

The ePDCCH may have a user specific search space, which may include a set of enhanced CCEs (eCCEs), and may be defined in terms of eCCEs or RBs. The ePDCCH spans only a narrow band of frequency resources, but frequency multiplexes with the PDSCH. FIG. 5 illustrates an example for frequency allocation in an MTC device for two consecutive subframes, subframe 142 and subframe 144. Subframe 142 contains control region 146 and data region 148, which contains PDSCH 150. Control region 146 may contain a DCI message for non-MTC devices. Data region 148 may carry the ePDCCH for the MTC device in subframe 142. Similarly, subframe 144 contains control region 152 and data region 154, which contains PDSCH 156. Like data region 148, data region 154 may carry the ePDCCH for the MTC device in subframe 144. In an example, the ePDCCH in data region 148 and the ePDCCH in data region 154 occupy different PRB pairs. The ePDCCH may occupy all symbols of a subframe except for the control region. Because the ePDCCH occupies all symbols of data region 148, it is desirable for devices to have the ability to decode the DCI message in the ePDCCH very quickly or use delay scheduling to determine when the PDSCH associated with the ePDCCH can be received. Because the UE processes the ePDCCH first, it must receive the symbols of the data region for that subframe initially.

There are potential issues using the ePDCCH. With non-MTC devices, once a DCI containing scheduling information for a PDSCH is identified, the non-MTC device can then process the resources associated with that PDSCH, because the symbols (or subcarriers) bearing those resources were stored in a buffer. The buffer enables non-MTC devices to process PRBs carrying the associated PDSCH in the same subframe as the ePDCCH. Processing both the ePDCCH and the associated PDSCH of the same subframe implies that the size of the buffer is large. An MTC device may process the ePDCCH and associated PDSCH in the same subframe if certain conditions hold. Such conditions include the size of the resources corresponding to the number of PRB pairs for the ePDCCH, the associated PDSCH, and the gap between the ePDCCH and PDSCH is not greater than the size of the buffer. Also, the ePDCCH and associated PDSCH occupy the PRB pairs that are within the bandwidth of the MTC device. However, to ensure that MTC devices are not expensive, the size of the buffer should be as small as possible. For an MTC device, a communications controller might follow the exemplary conditions. There is no guarantee that the communications controller can satisfy these exemplary condition while meeting the LTE requirements for other UEs in the system. An alternate approach for scheduling for ePDCCH and the associated PDSCH is needed for MTC devices.

Due to location of the ePDCCH in subframe k, a UE may store symbols of the next subframe (k+1) as it is processing ePDCCH. For an MTC device that processes a subset of the PRB pairs of the possible PRB pairs in the system in each subframe, the MTC device may not know beforehand which subset of PRB pairs to store in subframe (k+1) until it finished processing the ePDCCH in subframe k. Furthermore, a communications controller may be unable to transmit the PDSCH in subframe k+1 using the same bandwidth as the ePDCCH in subframe k. For example, in an overall 20 MHz downlink transmission, an MTC device may be able to use only 1.4 MHz (6 PRB pairs such as PRB pairs 6 to 11). In subframe k, the ePDCCH may be transmitted using some PRB pairs between PRB pairs 6 and 11, while the associated PDSCH in subframe k+1 is located in a region of PRB pairs 12-17. The MTC device may be unable to change the frequency band corresponding to the different set of PRB pairs for what it capturing without additional delay.

Another benefit to using the ePDCCH is power savings. With delay scheduling, the MTC device can skip processing future subframes if there is no scheduled PDSCH. Furthermore, if there are rules, such as that the ePDCCH and PDSCH cannot be transmitted in the same subframe to a given MTC device, further power savings may be achieved.

In an embodiment, the ePDCCH and the scheduled PDSCH are in different subframes. When delay scheduling is used, an MTC device buffers only the scheduled data, not the entire bandwidth of data. Thus, the MTC device may be implemented at a lower cost compared to a non-MTC device due to a reduced buffer size or relaxed operation speed.

Figure 6:
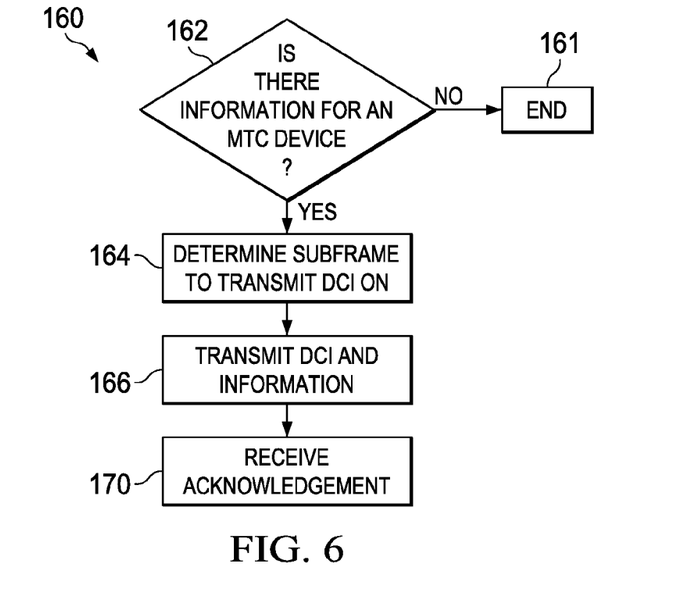
FIG. 6 illustrates an embodiment method of delay scheduling.

FIG. 6 illustrates flowchart 160 for a method of delay scheduling. This method is performed by communications controller 102. Initially, in step 162, communications controller 102 determines whether it has information for an MTC device. The information may be data information, control information, or both. This information may be transmitted on the PDSCH. When communications controller 102 does not have information for an MTC device, the method ends in step 161.

When there is information for an MTC device, communications controller 102 proceeds to step 164, where it determines on which subframe to transmit the DCI message. Communications controller 102 decides whether to transmit the DCI message on the PDCCH or ePDCCH. The decision may be based on the capabilities of the device. Also, communications controller 102 decides on which resources to place the DCI message. When the PDCCH is used, the resources may be control channel elements (CCEs) and the aggregation level. On the other hand, when the ePDCCH is used, the resources used may be the aggregation level, eCCEs, and one or more PRB pairs. Additionally, communications controller 102 decides what type of DCI message to transmit, and on which PRB pair(s) to transmit the PDSCH. In one example, the DCI message contains a field or offset for which later subframe or subframes contain the downlink data or are granted for uplink transmission.

After determining on which subframe to transmit the DCI message, communications control 102 transmits the subframe (i.e., the OFDM symbols of the subframe) with the DCI message to UE 104. Information, such as the PDSCH, is also transmitted to UE 104 in a separate subframe in step 166.

Finally, in step 170, communications controller 102 receives an acknowledgement associated with the transmission of information (e.g., PDSCH) to UE 104. An acknowledgement in step 170 can represent a positive acknowledgement (ACK), implying that the reception of information was correct, or a negative acknowledgment (NACK), implying that the reception of information was incorrect. Assuming that the PDSCH is sent in the kth subframe, for an FDD system, communications controller 102 receives the acknowledgement in the (k+4)th subframe. On the other hand, in a TDD system, communications controller 102 receives the acknowledgement, for example in the first uplink subframe that is in or after the (k+4)th subframe. In LTE Release-10, the resources for the acknowledgement are based on the index of the CCE for DCIs send on the PDCCH, and the transmission of the acknowledgement by an UE is based on the reception of the PDCCH. When it is sent on the ePDCCH, a procedure based on configuration parameters for the ePDCCH is used to determine the resources for the acknowledgement. With delay scheduling, the transmission of the acknowledgement can be based on the when the subframe containing the PDSCH was received. The transmission of the acknowledgement may also be based on when the PDCCH/ePDCCH was received and the delay value.

Figure 7:
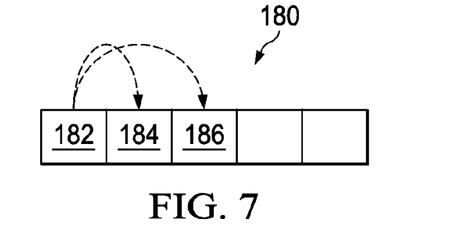
FIG. 7 illustrates the use of an offset value in a downlink control information (DCI) message.

FIG. 7 illustrates frame 180, which may be used for delay scheduling. Frame 180 contains consecutive subframes 182, 184, and 186. The DCI in subframe 182 may convey a bit field, for example three bits, that indicates which subframes are scheduled for downlink transmission. The bit field could be an index of a table of delay values. The bit field can also represent the delay value directly. For example, if the DCI is transmitted on subframe 182, the kth subframe, a delay value of 0 indicates that the scheduled PDSCH is in the kth subframe. However, a delay value of 1 indicates that the PDSCH is transmitted in the (k+1)th subframe (subframe 184), and a delay value of 2 indicates that the PDSCH is transmitted in the (k+2)th subframe (subframe 186). For MTC devices, when the DCI is transmitted in the PDCCH in subframe 182, the delay value of 0 may be disallowed, because subframe 182 cannot be used for its PDSCH for that MTC device. When the DCI is transmitted in the ePDCCH of subframe 182 for an MTC device, the values of 0 and 1 are disallowed, because, for that MTC device, its PDSCH cannot be transmitted on subframes 182 and 184.

For MTC devices, one reason for the delay value restrictions for the PDCCH and the associated PDSCH can be buffer size limitations. In subframe k, the MTC device can receive the symbols corresponding to the control region. The MTC device can then process both the common search space and UE specific search space of the PDCCH to find a DCI directed towards the MTC device. With delay scheduling, the MTC device can determine which data regions to capture in a future subframe. In subframe k, the MTC device stores all the resource elements of the symbols for the control region. Unless the width of the control region is known beforehand (e.g. via higher layer signaling or through a standards specifications), the MTC device may have to store symbols based on the maximum size of the control region. In one instance, for a 20 MHz system, there are 1200 resource elements per symbol, and a maximum size of the control region is 3 symbols. The MTC device may have to store 3×1200=3600 resource elements. If the communications controller indicates, with delay scheduling, that the PDSCH associated with the PDCCH is in subframe k+1, and the number of PRBs pairs used that PDSCH is 6 (corresponding to 1.4 MHz), the MTC device may store 72 resources/symbol×14 symbols=1008 resource elements of subframe k+1. Without delay scheduling, a device may store 1200 resource elements per symbol× 14 symbols/per subframe=16,800 resource elements. Since the PDCCH is located in the first few symbols of subframe k, the MTC device can finish processing the PDCCH in subframe k and still prepare for capturing a narrowband PDSCH in subframe k+1.

Figure 8:
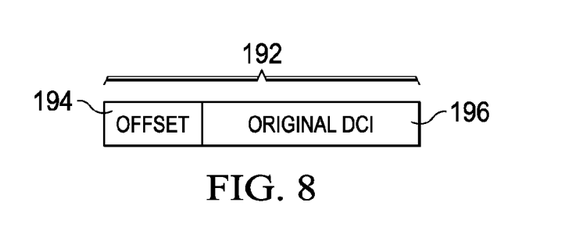
FIG. 8 illustrates the use of an offset value in a DCI message.

FIG. 8 illustrates an example of a DCI offset, which can be the label of the bit field in FIG. 7. DCI message 192 contains offset 194 and original DCI 196. Offset 194 is placed in original DCI 196, for example by prepending. Alternatively, offset 194 is placed at the end of original DCI 196. The offset for PDSCH transmission for MTC devices may be a subset of a range when the same DCI format is also used for non-MTC devices. Also, when the DCI message is in subframe k, there may be indicators or mappings indicating the width of the control region of subframe k+d, where d is determined by DCI offset 194 in DCI message 192. Alternatively, there may be indicators, mappings, and/or higher layer signaling to indicate the starting symbol of the associated PDSCH in subframe k+d.

Figure 9:
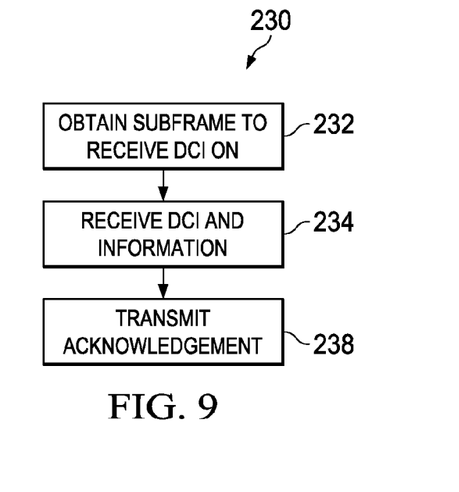
FIG. 9 illustrates another embodiment method of delay scheduling.

FIG. 9 illustrates flowchart 230 for a method of delay scheduling performed by UE 104. In one example, UE 104 is an MTC device. In another example, UE 104 is a non-MTC device. Initially, in step 232, UE 104 examines on which subframe it will receive a DCI message. UE 104 may search for a DCI on every subframe, in which case step 232 is bypassed. During discontinuous reception (DRX), UE 104 examines certain subframes. For MTC devices, there may be configurable periods where the device looks for the DCI. When UE 104 only receives the DCI message on the ePDCCH, UE 104 determines which PRB pair contains the ePDCCH.

Then, in step 234, UE 104 receives the symbols of the subframe containing the DCI message from communications controller 102. This is done, for example, by searching the appropriate search spaces of the PDCCH or ePDCCH for the locations of the PDCCH or ePDCCH carrying the modulated DCI. Upon finding the DCI message, UE 104 processes the DCI message to determine its contents. UE 104 also receives information from communications controller 102, for example in the same subframe or a subsequent or future subframe. The information conveyed in the PDSCH may be data information, control information (such as higher layer signaling), or both. UE 104 receives the PDSCH based on the processed DCI message. The delay value for receiving the PDSCH may be based on the contents of the DCI message, the broadcast information, or specification rules. Rules in the specification may indicate the timing between the DCI message and the associated PDSCH. Also, UE 104 may obtain a delay value, for example from broadcast information, such as a physical broadcast channel PBCH or an enhanced PBCH (ePBCH). In another example, UE 104 obtains a delay value by receiving the delay value in a high layer radio resource control (RRC) signal, such as the system information (SI). In an additional example, UE 104 knows the delay value.

Then, in step 238, UE 104 transmits an acknowledgement message to communications controller 102. In an example, communications controller 102 reserves a physical uplink control channel (PUCCH) for acknowledgment from UE 104 to avoid PUCCH resource conflicts between MTC devices and non-MTC devices.

In an embodiment, UE 104 operates in HD-FDD mode. In HD-FDD mode, the acknowledgement is transmitted by UE 104 after a fixed delay from receiving the PDSCH. For example, UE 104 transmits the PUSCH in the (n+4)th subframe after detecting the uplink grant in the nth subframe. To simplify the scheduler for communications controller 102, when a conflict between uplink and downlink transmission appears, either the uplink or downlink transmission is dropped. For example the transmission with the lower priority is dropped.

In one example, delay scheduling is used for MTC devices, but not for non-MTC devices. For example, non-MTC devices may be scheduled by another method, such as using a PDCCH or ePDCCH to schedule the PDSCH in the current subframe. Alternatively, delay scheduling is used for both MTC devices and non-MTC devices.

When delay scheduling is only used for MTC devices, the delay may be a fixed value d. Communications controller 102 transmits the PDCCH or ePDCCH in the nth subframe to schedule the PDSCH in the (n+d)th subframe. For example, d may be 2, 3, or another value. In one embodiment, the value of d is written into the specification. Both communications controller 102 and UE 104 know the value of d. A benefit of an embodiment is how delay scheduling may facilitate an extra 20 dB of coverage for MTC devices. In one example, more than one subframe, for example 200 subframes, may be used to transmit the same DCI to a particular MTC device. After decoding the DCI, the MTC device may begin receiving the PDSCH, possibly in multiple subframes after obtaining the delay value.

In another example where delay scheduling is used only for MTC devices, the delay value is transmitted in the physical broadcast channel (PBCH) or enhanced PBCH (ePBCH). In this example, communications controller 102 or another part of the network sets the delay value. UE 104 then obtains the delay value, for example by extracting it from the PBCH or ePBCH.

When delay scheduling is used for both MTC devices and non-MTC devices, there may be two or more delay values. For example, MTC devices use one fixed delay value to receive the system information block 1 (SIB1) message. Non-MTC devices receive both the DCI message and the SIB1 on subframe 5, while MTC devices cannot receive the DCI and SIB1 in the same subframe. The MTC device then receives another delay value after processing the SIB1 message. The second delay value may be configured by the network, and may override the first value. For example, the first delay indicates that the SIB1 message is transmitted in subframe 5. However, the corresponding DCI message (carried in either the PDCCH or ePDCCH for the SIB1 message) is transmitted at a fixed earlier delay, such as in subframe 3. In another example, the PDCCH or ePDCCH for the SIB1 message is transmitted in subframe 5, while the SIB1 message for the MTC device is transmitted in a later subframe.

In one embodiment, the delay value may be signaled by the DCI message. There can be a field in the DCI message to indicate which subframe is or subframes are scheduled for the device to transmit data on for uplink or to receive data on for downlink. In one example, the DCI message has one value when scheduling SIB messages on the PDSCH and another value when scheduling other information on the PDSCH. In this example, non-MTC devices may use an offset for the common messages when a single SIB message is used. For backwards compatibility, the DCI message may not have a delay field for non-MTC devices.

Delay scheduling may also be used in TDD. However, in TDD, because there may be uplink subframes interspersed between downlink subframes, some uplink subframes may be skipped over before transmitting the PDSCH in a downlink subframe using delay scheduling. Because communications controller 102 has no knowledge of the UE device type until the random access channel (RACH) process, communications controller 102 assumes that both MTC devices and non-MTC devices exist in the cell. In one example, communications controller 102 transmits a single DCI scrambled by system information radio network system information (SI-RNTI), paging RNTI (P-RNTI), or random access response RNTI (RAR-RNTI). However, communications controller 102 transmits two PDSCH in different subframes based on the single DCI. UE 104 knows how to interpret the delay of the PDSCH based on its capability (such as a category 1, category 2, and possibly category 0 device), and the subframe in which the DCI was received. All fields in the DCI messages are common for these two PDSCH. For non-MTC devices, the PDSCH is received on the same subframe as the PDCCH or ePDCCH with an implicit delay of zero. For MTC devices, there is a delay between receiving the PDCCH or ePDCCH and the PDSCH.

In another embodiment, two DCI messages are used to schedule a common broadcast PDSCH (e.g. SIB1). One DCI message is used for non-MTC devices, and the other DCI message is used for MTC devices.

In an embodiment, common messages are transmitted in known PRBs with fixed MCS and locations. Thus, no delay is needed. This information may be conveyed in other RRC messages.

Figure 10:
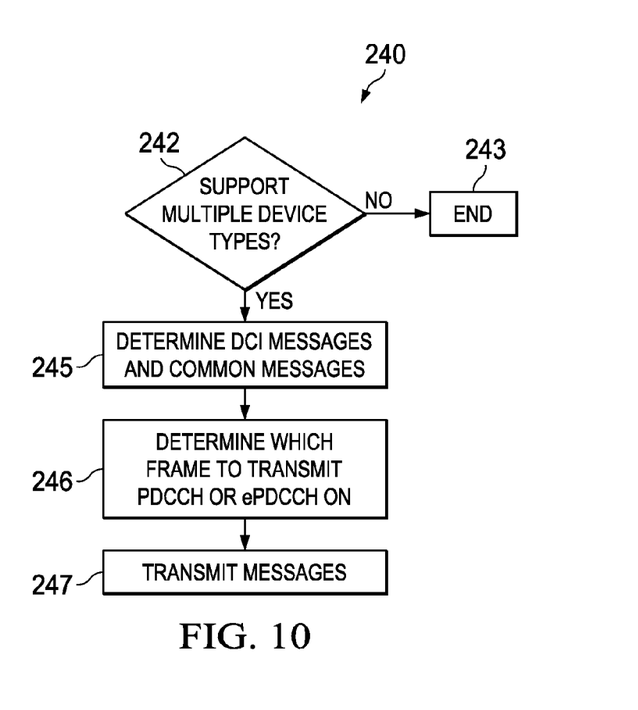
FIG. 10 illustrates an embodiment method of transmitting common messages.

FIG. 10 illustrates flowchart 240 for a method of transmitting common messages by communications controller 102. Initially, in step 242, communications controller 102 determines whether it supports multiple types of devices. For example, communications controller 102 may support both MTC devices and non-MTC devices. In one example, communications controller 102 is required to support multiple types of device. When communications controller 102 does not support multiple types of devices, the method goes to step 243 and ends.

When communications controller 102 supports multiple types of devices, whether duplicate or separate common messages will be transmitted to different device types may be specified, for example in a standard. For example, MTC devices and non-MTC devices may not be capable of receiving common messages in the same subframe. Examples of common messages include system information (SI), paging, and RAR messages. When communications controller 102 supports multiple types of devices, it may encapsulate separate common messages for different device types. On the other hand, communications controller 102 may duplicate the same common message for the different types of devices.

Next, in step 245, communications controller 102 determines the DCI messages and the contents for the common messages. When one DCI message is used for the common messages, communications controller 102 may transmit duplicate or separate common messages in different subframes. In one example, the same message is duplicated and transmitted in different subframes. In another example, separate messages are transmitted. One message is targeted at non-MTC devices in the same subframe as the DCI, and a similar message, possibly with slightly different parameters or fields, is targeted at MTC devices in a future subframe. On the other hand, when two DCI messages are used, one for each type of device, the DCI messages are separately scrambled. For example, the DCI message for non-MTC devices is scrambled by SI-RNTI, P-RNTI, or RAR-RNTI. On the other hand, the DCI message for MTC devices can be scrambled by new RNTIs, such as multicast channel (MCH) scheduling information RNTI (MSI-RNTI), multiple P-RNTI (MP-RNTI), or multiple RAR RNTI (MRAR- RNTI). In scrambling the DCI messages, the cyclic redundancy check (CRC) code is computed to produce a parity sequence. Then, the parity sequence is added to the RNTI value using a bitwise exclusive-or operation. Finally, this value is appended to the original DCI message. An example of a modulated DCI is a DCI message that is scrambled, encoded, interleaved, rate matched, and mapped in a sequence of constellation points, such as quadrature phase shift keying (QPSK) points. In another embodiment, the DCI message length is different for MTC devices and non-MTC devices. For example, a DCI format 1A message may be 27 bits for non-MTC devices, but 31 bits for MTC devices. The difference in size of the messages can be due to a field representing the delay value. In this example, the same scrambling value is used for both messages. In an example, communications controller 102 also decides whether to transmit the DCI message within the PDCCH or the ePDCCH. Communications controller 102 may determine which resources to place the modulated DCI message on or determine the type of DCI message to transmit. Additionally, communications controller 102 may determine which PRB pair(s) to transmit the PDSCH on.

After determining the DCI messages, communications controller 102, in step 246, determines which subframe to transmit the PDCCH or ePDCCH on for the common message or messages. For example, when a SIB1 message is used, the SIB1 is transmitted on subframe 5. The PDCCH or ePDCCH is also transmitted in subframe 5 for non-MTC devices, with no delay (an implicit delay value of 0). On the other hand, for MTC devices, the PDCCH or ePDCCH is transmitted earlier with a time advance. For example, the PDCCH or ePDCCH is transmitted on subframe 3. Alternatively, the PDCCH or ePDCCH is also transmitted on subframe 5 for MTC devices, and the duplicated SIB1 or separate SIB1 is transmitted in a later subframe for MTC devices.

Finally, in step 247, communications controller 102 transmits the common messages to UE 104. This is done in accordance with the subframe conveying the PDCCH or ePDCCH.

Figure 11:
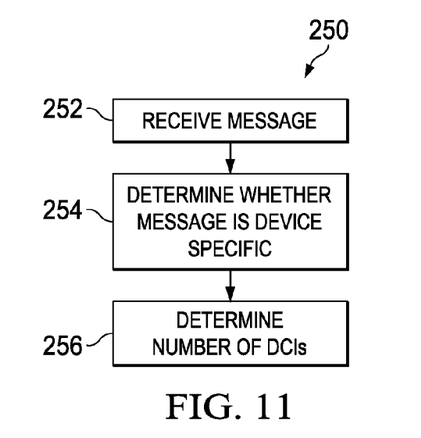
FIG. 11 illustrates an embodiment method of receiving common messages.

FIG. 11 illustrates flowchart 250 for a method of receiving common messages by UE 104 when multiple types of devices coexist in a cell. UE 104 may be an MTC device or a non-MTC device. Initially, in step 252, UE 104 receives a common message from communications controller 102.

After receiving the common message, UE 104 determines whether the message is a common message specific to the device type of UE 104 or a common message shared with other device types, in step 254. In one example, whether common messages are device specific or shared is a system configuration, which for example is transmitted on the PBCH.

Then, in step 256, UE 104 determines the number of DCI messages transmitted on the common search space. There may be zero, one, or more DCI messages transmitted on the common search space. When there is a DCI message, different device types may interpret the DCI message differently. For example, the resource assignment (RA) field in the DCI is distributed for non-MTC devices but concentrated for MTC devices. When there are two DCI messages, non-MTC devices may receive one DCI message scrambled by SI-RNTI, P-RNTI, or RAR-RNTI, while MTC devices receive the other DCI message scrambled with new RNTIs, such as MSI-RNTI, MP-RNTI, or MRAR-RNTI.

Figure 12:
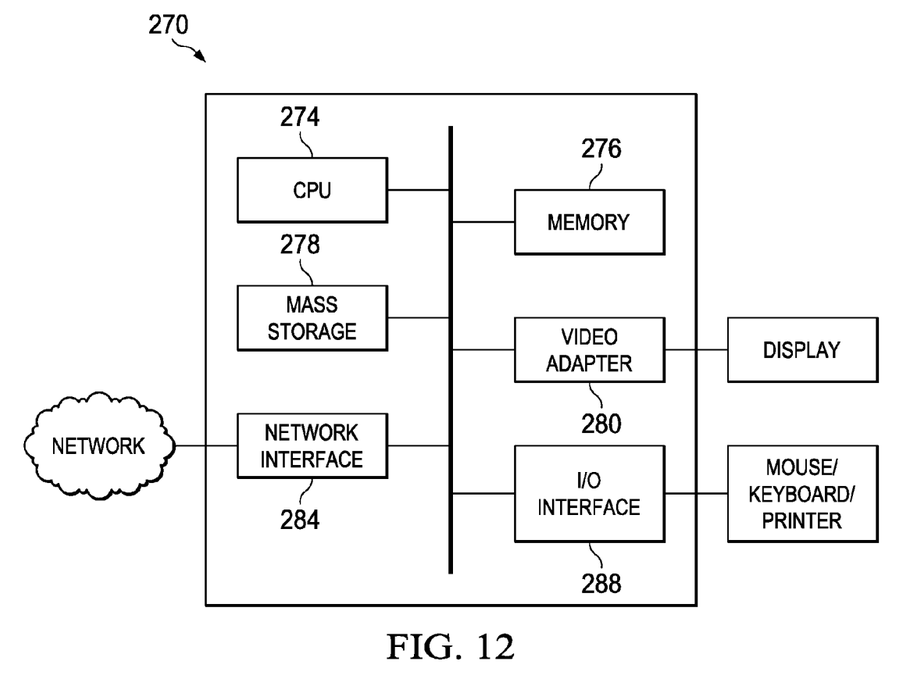
FIG. 12 illustrates a block diagram of an embodiment of a general-purpose computer system.

FIG. 12 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for delay scheduling, the method comprising:
   determining a first subframe on which to transmit a first downlink control information (DCI) message;
   determining a second subframe on which to transmit a first information, the first information being scheduled to be transmitted on the second subframe in accordance with scheduling information indicated in the first DCI message;
   determining a delay between the first subframe and the second subframe according to a capability of a user equipment; and
   transmitting, by a communications controller to the user equipment, the second subframe in accordance with the delay.

2. The method of claim 1, wherein determining the delay is further performed in accordance with a control channel.

3. The method of claim 1, further comprising transmitting, by the communications controller to the user equipment, the first subframe.

4. The method of claim 1, wherein the delay is further determined in accordance with the first information.

5. The method of claim 1, wherein the first DCI message comprises a field indicating the delay.

6. The method of claim 1, further comprising transmitting higher layer signaling by the communications controller, the delay.

7. The method of claim 1, further comprising determining the capability of the user equipment in accordance with a device category of the user equipment, a processing capability of the user equipment, or a coverage of the user equipment.

8. The method of claim 7, wherein the device category of the user equipment is a machine type communications (MTC) device or a non-MTC device.

9. The method of claim 1, wherein the second subframe further comprises a second DCI message, wherein the second DCI message indicates scheduling of the first information.

10. The method of claim 9, wherein the first DCI message corresponds to a first device category of the user equipment and the second DCI message corresponds to a second device category of the user equipment.

11. The method of claim 1, wherein the first subframe comprises a second information, wherein the first DCI message indicates scheduling of the second information.

12. The method of claim 1, further comprising determining whether the communications controller supports different device categories.

13. A method for delay scheduling, the method comprising:
   receiving, by a user equipment from a communications controller, symbols of a first subframe comprising a downlink control information (DCI) message;
   receiving, by the user equipment from the communications controller, symbols of a second subframe comprising information in accordance with a delay and a capability of the user equipment, wherein the DCI message indicates scheduling of the information; and
   obtaining the delay, wherein the delay is based on the capability of the user equipment.

14. The method of claim 13, wherein obtaining the delay comprises receiving, by the user equipment from the communications controller, the delay.

15. The method of claim 14, wherein the DCI message comprises a field indicating the delay.

16. The method of claim 13, wherein the delay is obtained by a higher layer signaling.

17. The method of claim 13, further comprising transmitting, by the user equipment to the communications controller, an acknowledgement in accordance with the information and the delay another delay after receiving the symbols.

18. The method of claim 13, further comprising obtaining the capability of the user equipment in accordance with a device category of the user equipment, a processing capability of the user equipment, or a coverage of the user equipment.

19. A communications controller comprising:
   a processor; and
   a computer readable storage medium storing programming for execution by the processor, the programming including instructions to
     determine a first subframe on which to transmit a downlink control information (DCI) message,
     determine a second subframe on which to transmit an information, wherein the DCI message indicates scheduling of the information,
     determine a delay between the first subframe and the second subframe according to a capability of a user equipment, and
     transmit, to the user equipment, second subframe in accordance with the delay.

20. A user equipment comprising:
   a processor; and
   a computer readable storage medium storing programming for execution by the processor, the programming including instructions to
     receive, from a communications controller, symbols of a first subframe comprising a downlink control information (DCI) message,
     receive, from the communications controller, symbols of a second subframe comprising information in accordance with a delay and a capability of the user equipment, wherein the DCI message indicates scheduling of the information; and
     obtain the delay, wherein the delay is based on the capability of the user equipment.

21. The method of claim 1, wherein the delay is fixed.

22. The method of claim 1, wherein the delay is zero.

23. The method of claim 1, wherein the second subframe is a first subframe of a physical downlink shared channel (PDSCH).

24. The method of claim 17, wherein the acknowledgment delay is greater than or equal to four subframes.

* * * * *